United States Patent
Lee et al.

(10) Patent No.: US 10,719,150 B2
(45) Date of Patent: Jul. 21, 2020

(54) TOUCH PANEL AND FABRICATION METHOD THEREOF

(71) Applicant: TPK Touch Solutions (Xiamen) Inc., Xiamen (CN)

(72) Inventors: Yuh-Wen Lee, Hsinchu (TW); Chuandai Tang, Xiamen (CN); Xianbin Xu, Xiamen (CN); Fengming Lin, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/871,987

(22) Filed: Jan. 16, 2018

(65) Prior Publication Data
US 2018/0136751 A1   May 17, 2018
US 2019/0324565 A9   Oct. 24, 2019

Related U.S. Application Data

(62) Division of application No. 14/296,271, filed on Jun. 4, 2014, now Pat. No. 9,874,954.

(30) Foreign Application Priority Data

Jun. 4, 2013 (CN) .......................... 2013 1 0216959

(51) Int. Cl.
*G06F 3/041* (2006.01)
*G06F 1/16* (2006.01)
*G06F 3/044* (2006.01)

(52) U.S. Cl.
CPC ................ *G06F 3/041* (2013.01); *G06F 1/16* (2013.01); *G06F 3/044* (2013.01); *G06F 2203/04103* (2013.01); *G06F 2203/04107* (2013.01)

(58) Field of Classification Search
CPC .. G06F 3/041; G06F 1/16; G06F 2203/04107; G06F 3/044; G06F 2203/04103
See application file for complete search history.

(56) References Cited

U.S. PATENT DOCUMENTS

2015/0251393 A1* 9/2015 Kanna .................. B32B 3/10
                                                            428/334

* cited by examiner

Primary Examiner — Charles V Hicks (57) ABSTRACT

A touch panel and a fabricating method thereof are provided in the instant disclosure. The touch panel having a non-display area and a display area includes a shielding layer disposed on a side of a substrate and defining the non-display area on the substrate; a sensing electrode layer disposed on the substrate at the same side as the shielding layer, wherein at least one portion of the sensing electrode layer is disposed on a surface of the substrate in the display area; a first protecting layer disposed in the display area and covering the sensing electrode layer; and a second protecting layer disposed in the non-display area and covering the shielding layer. By modifying the structure of the protecting layer, the height difference between the sensing electrode layer and the shielding layer may not cause the color difference due to the non-uniform protecting layer.

20 Claims, 5 Drawing Sheets

TOUCH PANEL AND FABRICATION METHOD THEREOF

BACKGROUND OF THE INVENTION

The present invention claims the priority of China Patent Application No. 201310216959.4 filed on Jun. 4, 2013, which is incorporated by reference in the present application in its entirety.

Field of the Invention

The present invention relates to a touch panel technology; in particular, to a touch panel and a fabrication method thereof.

Description of Related Art

As the development of the touch control technology, the touch panel has been widely used in various consumer electronic devices, such as smart phone, tablets, digital camera, e-book, MP3 player, and so on, which are portable electronic products. The touch panel also can be applied to the display screen of the apparatus for operating and controlling. The touch panel not only provides convenience of input operation to user, it also has the advantages in its thinner shape, the lighter weight and the price competitiveness.

The touch panel typically includes a substrate, a sensing electrode layer, a shielding layer and a protective layer. The protective layer is formed on the both the sensing electrode layer and the shielding layer to protect the sensing electrode layer from the physical or chemical damage.

However, the thickness of the shielding layer is (about ten to hundred times) thicker than that of the sensing electrode layer. There is a "step" formed between the shielding layer and the sensing electrode layer due to the thickness difference therebetween. While the protective layer is formed on both of the shielding layer and the sensing electrode layer in the following process, the step would easily result in the non-uniformity of the protective layer, and the appearance of the color difference in the protective layer. The color difference would impact the transparent property of the touch panel.

BRIEF SUMMARY OF THE INVENTION

The object of the present invention is related to a touch panel and fabrication method thereof.

According to one of the present disclosure, by means of changing the structure of the protecting layer and adjusting the processes, the protecting layer having two portions is designed to deposit on the sensing electrode layer and the shielding layer respectively. The two portions of the protecting layer are formed independently, and thus the non-uniform coating for each portion would not occur despite the existence of thickness difference between the shielding layer and the sensing electrode layer.

In order to achieve the aforementioned objects, according to an embodiment of the present invention, a touch panel is provided. The touch panel defines a non-display area and a display area corresponding to the non-display area. The touch panel includes a shielding layer disposed at a side of a substrate, wherein the substrate covered by the shielding layer defines the non-display area; a sensing electrode layer disposed on the substrate at the same side as the shielding layer, wherein at least a portion of the sensing electrode layer superimposes the display area; a first protecting layer disposed in the display area and covering the sensing electrode layer; and a second protecting layer, disposed in the non-display area and covering the shielding layer.

In another embodiment of the instant disclosure, a fabricating method of the touch panel is provided. The touch panel defines a display area and a non-display area corresponding to the display area. The method comprising: forming a shielding layer on a side of a substrate, wherein an area covered by the shielding layer defines the non-display area; forming a sensing electrode layer on the substrate at the same side as the shielding layer, wherein at least a portion of the sensing electrode layer superimposes the display area; forming a first protecting layer at least in the display area to cover the sensing electrode layer; and forming a second protecting layer in non-display area to cover the shielding layer.

As a result, the color difference may be avoided, and the factors reducing the transparency of the touch panel may be weakened in the instant disclosure. In addition, the protecting layer of the instant disclosure has two different portions which may be made of different materials. In addition to protection, the first protecting layer covers the sensing electrode layer and has a refractive index larger than or equal to that of the sensing electrode, and therefore the difference of the refractive indices is minimized. In addition to protection, the second protecting layer, which correspondingly covers the shielding layer and the signal transmitting layer, also provides a reliable adhesion to the shielding layer. Taken as a whole, the display quality of the touch panel can be improved.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

The orientations of "upper" and "lower" of the touch panel in the description of the embodiments are only used to represent the relative position. In the drawings of the instant disclosure, the "upper side" of the touch panel means it is the farthest side from a user, and the "lower side" of the touch panel means it is the nearest side from the user. Moreover, the touch panel of the embodiment defines a non-display area and a display area. In general, the non-display area may be allocated at least one peripheral side of the display area. All of the embodiments of the instant disclosure are described in the condition of the non-display area surrounding the display area.

Figure 1:
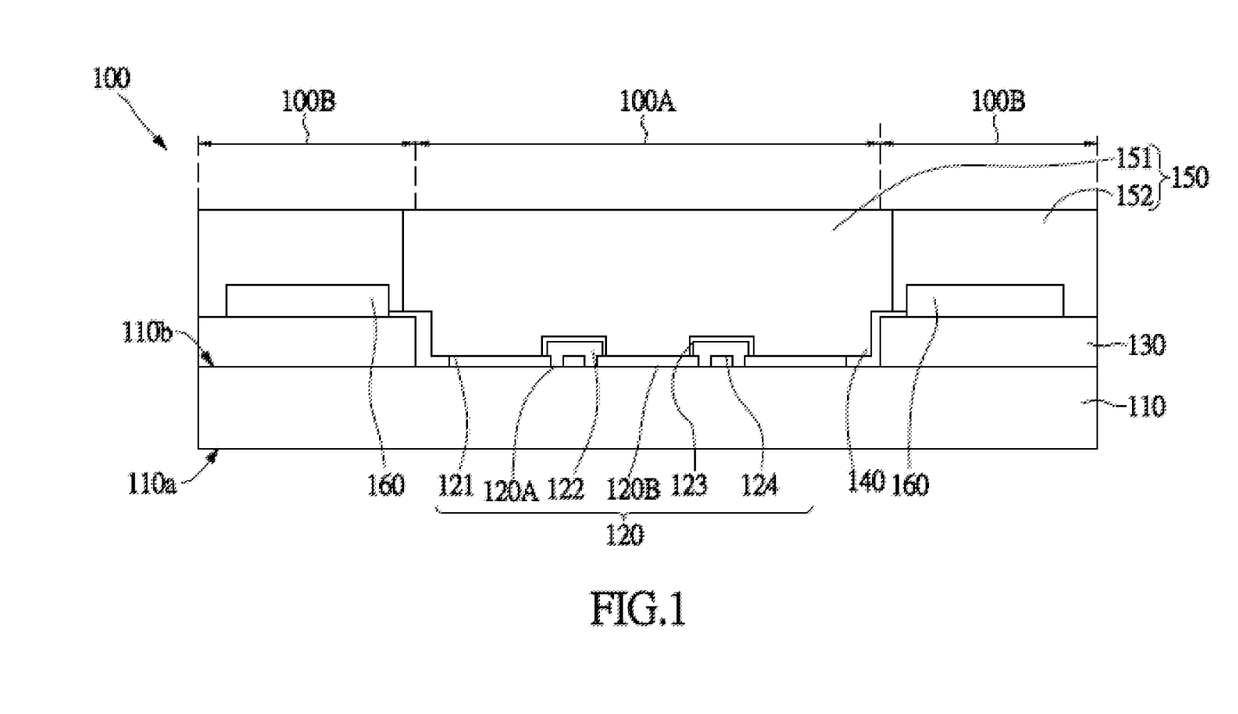
FIG. 1 shows a cross-sectional view of a touch panel according to a first embodiment of the instant disclosure.

Please refer to FIG. 1. FIG. 1 shows a cross-sectional view of a touch panel according to a first embodiment of the instant disclosure. The touch panel 100 of the present embodiment includes a substrate 110, a shielding layer 130, a sensing electrode layer 120, a first protecting layer 151 and a second protecting layer 152. The substrate 110 may be made of the transparent material, such as glass and the like. The substrate 110 has a lower surface 110a and an upper surface 110b opposite thereto. The lower surface 110a serves as the operating surface for a user. The upper surface 110b is used to form each element of the touch panel 100 thereon, and the example will be explained in detail in the following description. Furthermore, in the instant embodiment, the lower surface 110a of the substrate 110 may be processed by surface treatments, such as toughening, scratch-resistant process, anti-glare process, antimicrobial and/or anti-reflective process. On top of supporting, the surface treatment of the lower surface 110a allows the substrate 110 to be protected.

The shielding layer 130 is disposed on the peripheral portion of the upper surface 110b of the substrate 110, and an area covered by the shielding layer 130 defines the non-display area 100B. In the present embodiment, the shielding layer 130 is an opaque and insulating layer, such as the black or the other colors polyimide layer, or ink layer. The shielding layer 130 may be formed by deposition, lithography and etching processes.

The sensing electrode layer 120 and the shielding layer 130 are configured on the same side of the substrate 110, i.e. on the upper side. At least a portion of the sensing electrode layer 120 is configured on the upper surface 110b of the substrate 110 and in the display area 100B to provide the touch sensitivity for a user. Specifically, the sensing electrode layer 120 includes a plurality of first electrodes 121 arranged in rows, a plurality of second electrodes (not shown in FIG. 1) arranged in columns, and a plurality of connecting portions 124 connecting a pair of two immediately adjacent second electrodes (not shown) in the same column. Every two immediately adjacent first electrodes 121 in the same row are connected to each other by one of the bridging portions 123. The sensing electrode layer 120 includes a plurality of insulating portions 122, each of which is sandwiched between a pair of the bridging portion 123 and connecting portion 124. The arrangement of the abovementioned elements (i.e., the first electrodes 121, the second electrodes, the connecting portions 123, the bridging portions and the insulating portions 124 of the sensing electrode layer 120) defines an etching area 120A and a non-etching area 120B on the sensing electrode layer 120.

At least a portion of the first protecting layer 151 is arranged in display area 100B, and covers the sensing electrode layer 120 at the display area 100B to protect the sensing electrode layer 120 from the physical or chemical damage. Of course, since the etching area 120A and non-etching area 120B are defined on the sensing electrode layer 120, the first protecting layer 151 not only covers the non-etching area 120B of the sensing electrode layer 120, but also covers a portion of the substrate 110 appeared from the etching area 120A. The second protecting layer 152 is arranged at the non-display area 100B, and superimposes the shielding layer 130. Since the shielding layer 130 for defining the non-display area 100B surrounds the display area 100A, in the instant embodiment, the second protecting layer 152 may have the frame-like shape.

As the abovementioned embodiment, by specific designs for the first protecting layer 151 and the second protecting layer 152, the protecting layer 150, which is fabricated in the back-end processes in the whole structure of the touch panel 100, would not be extremely affected due to the thickness difference between the shielding layer 130 (with a thickness ranging between 1.5 µm to 20 µm) and the sensing electrode layer 120 (with a thickness ranging between 250 Å to 300 Å). During the fabrication of the protecting layer 150, the color difference resulting from the non-uniform coating of the protecting layer 150 may be effectively avoided, and thus the factors reducing the transparency of the touch panel 100 may be weakened, and the manufacturing yield of the touch panel 100 may be increased.

For the further description, in the present embodiment, the sequence of the steps, i.e., forming the shielding layer 130 and then forming the sensing electrode layer 120, is just as an example. Moreover, the sensing electrode layer 120 may further extend to top surface of the shielding layer 130, which is arranged in the non-display area 100B. In one embodiment, as shown in FIG. 1, the sensing electrode layer 120, which has a portion in the display area 100A and the other portions in the non-display area 100B, is fabricated in the same process. In another embodiment, the portion in the non-display area 100B may be an independent connecting portion and manufactured by an additional process rather than the process for manufacturing the other portions in the display area 100A. However, the aforementioned fabrications are not used for limiting the scope of the instant disclosure.

The touch panel 100 of the instant embodiment further includes a signal transmitting layer 160. The signal transmitting layer 160 is interposed between the shielding layer 130 and the second protecting layer 152, and electrically connected to the sensing electrode layer 120 for transmitting the signal between the sensing electrode layer 120 and an external controller (not shown). As a result, in the instant embodiment, the second protecting layer 152 in the non-display area 100B may not only cover the shielding layer 130, but also cover the signal transmitting layer 160 to protect the signal transmitting layer 160 from the physical or chemical damage. For example, the signal transmitting layer 160 is a stack of Mo/Al/Mo layers. The Al layer sandwiched between these two Mo layers is so chemically reactive that the Al layer is easily oxidized and forms an insulating aluminum oxide film when the Al layer is exposed to the air. It is hence the second protecting layer 152 which may isolate the signal transmitting layer 160 from the air to prevent the Al layer from the oxidation, and may reduce the probability of the explosion of the Al layer caused by the damage of the Mo layer.

It is worth mentioning that the first protecting layer 151 of the instant embodiment may be a refractive index compensating layer, and the second protecting layer 152 may be an attaching layer. As a result, the first protecting layer 151 correspondingly covering on the sensing electrode layer 120 not only provides the function of protection, but also compensates and matches the refractive index of the sensing electrode layer 120 so that the etching lines formed between the etching area 120A and the non-etching area 120B on the sensing electrode layer 120 become visually invisible. The second protecting layer 152 correspondingly covering the shielding layer 130 and the signal transmitting layer 160 also provides a reliable adhesion to the shielding layer 130 in addition to providing the function of the protection.

The refractive index compensating layer, in one embodiment, may be made of a material selected from a group consisting of the metal oxide, non-metal oxide, Si-based material and the combination thereof. The refractive index compensating layer can be designed in single or multi layers in structure. Given the refractive index of the refractive index compensating layer of the instant embodiment is n1, and the refractive index of the sensing electrode layer is n2. In this case, the refractive index n1 of the refractive index compensating layer is larger than or equal to the refractive index n2 of the sensing electrode layer in the instant embodiment. Therefore, the difference of the refractive indices for visible light of the etching area 120A and the non-etching area 120B is minimized. In addition, poor display quality due to different refractive indices may be avoided, and a better display quality of the touch panel 100 may be achieved.

Figure 2:
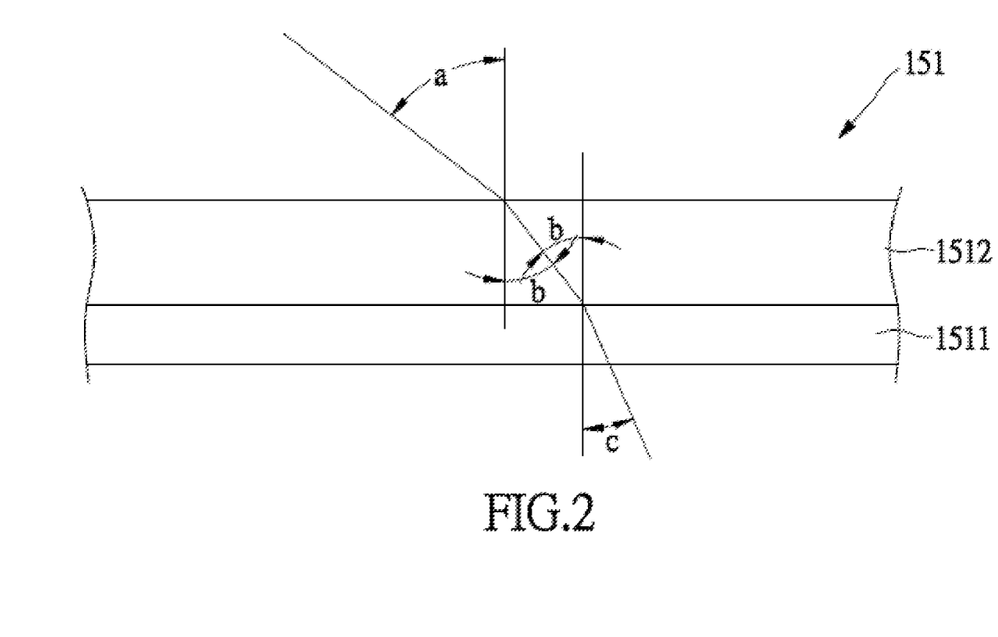
FIG. 2 shows an enlarged perspective view showing the detail of the first protecting layer in FIG. 1.

Please refer to FIG. 2. FIG. 2 illustrates an enlarged perspective view showing the detail of the first protecting layer in FIG. 1. More specifically, the first protecting layer 151 of the instant embodiment includes a first refractive index layer 1511 and a second refractive index layer 1512, which makes the first protecting layer 151 to be composite multilayered while the first protecting layer 151 is designed to be the refractive index compensating layer. The first refractive index layer 1511 covers on the sensing electrode layer 120, the second refractive index 1512 is disposed on the first refractive index layer 1511. In addition, with respect to the refractive index n1 of the refractive index compensating layer, which is composite multilayered, please further refer to the following description.

Given the refractive index of the first refractive index layer 1511 is n3, and the refractive index of the second refractive index layer 1512 is n4, wherein n3 and n4 meet the following equations (1)-(3):

$$n3 = \sin a/\sin b \quad (1)$$

$$n4 = \sin b/\sin c \quad (2)$$

$$n3*n4 = (\sin a/\sin b)*(\sin b/\sin c) = \sin a/\sin c \quad (3)$$

Thus, the refractive index n1 of the refractive index compensating layer, n3 and n4 meet the following equations:

$$n3 = n1*n2.$$

By the stacking configuration of the first refractive index layer 1511 and the second refractive index layer 1512 in the instant embodiment, the refractive index of the refractive index compensating layer, which is composite multilayered, is larger than or equal to that of the sensing electrode layer 120 disposed in the display area 100B.

In one embodiment, the refractive index n3 of the first refractive index layer 1511 is less than the refractive index of the sensing electrode layer 120, and the refractive index n4 of the second refractive index layer 1512 is larger than the refractive index of the sensing electrode layer 120. Specifically, if the first electrode 121 and the second conductive pattern (not shown) of the sensing electrode layer 120 are patterned indium tin oxide (ITO) layers which have the refractive index of 1.86, the first refractive index layer 1511 would be a layer having smaller refractive index, for example, silicon dioxide ($SiO_2$) layer having a refractive index of 1.46 with a thickness ranging between 30 nm to 50 nm. The second refractive index layer 1512 may be a layer, the refractive index of which is larger than 1.86, for example, niobium pentoxide ($Nb_2O_5$) with a refractive index of 2.35 and a thickness ranging between 5 nm to 10 nm. In another embodiment, the first refractive index layer 1511 is $Nb_2O_5$ layer, and the second refractive index layer 1512 is $SiO_2$ layer. In other words, the refractive index compensating layer being composite multilayered may be, for example, formed by a $SiO_2$ layer and a $Nb_2O_5$ layer according to the refractive index of the sensing electrode layer 120 in practice.

The attaching layer, in one embodiment, is an organic material layer. The properties of the material of the attaching layer are the same as or similar to that of the shielding layer 130, and the attaching layer thus produces a more reliable adhesion to the shielding layer 130. The attaching layer composed of the organic materials undergoes the cross-cut tape test (ASTM D3359-93), and the adhesion degree of the attaching layer to the shielding layer 130 is at least 4B. The frequency of stripping is less than 5%. Accordingly, the signal transmitting layer 160 disposed between the attaching layer and the shielding layer 130 may be completely protected and isolated from the air, and the probability of the oxidation of the signal transmitting layer 160 is reduced.

In one embodiment, the organic material may be a polyimide (PI) material, an ink material, an alcohol material or the combination thereof. The compositions of the polyimide material include Silane and Polymethylmethacrylate (PMMA). The compositions of the ink materials include the pigment, the resin and the auxiliary agent, wherein the pigment may be titanium dioxide or toner, and the auxiliary agent may be curing agent or thickening agent. The alcohol materials may be ethylene glycol, propylene glycol, ethanol, isopryl alcohol or the combination thereof. The adhesion of the attaching layer may be optimized by adjusting the content of each component to provide the better adherence for the shielding layer 130.

Figure 3:
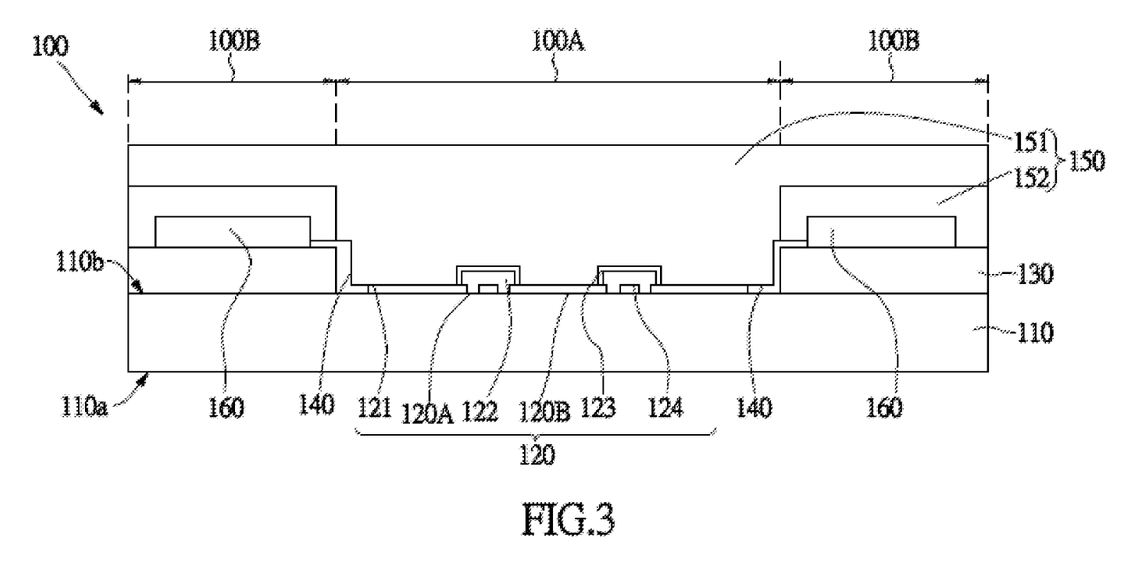
FIG. 3 shows a cross-sectional view of a touch panel according to a second embodiment of the instant disclosure.

For the following description, please refer to FIG. 3. FIG. 3 shows a cross-sectional view of a touch panel according to a second embodiment of the instant disclosure. As shown in FIG. 3, the structure of the touch panel of the instant embodiment is substantially similar to the first embodiment as shown in FIG. 1. The difference is that, in the instant embodiment, the first protecting layer 151 further extends to the non-display area 100B, and is formed on the surface of the second protecting layer 152. As a result, the second protecting layer 152 may be protected from peeling off. The first protecting layer 151 of the instant embodiment is completely formed on the surface of the second protecting layer 152. Of course, according to the demands for the practical design, the first protecting layer 151 also may be formed on only one portion of the second protecting layer 152, which is not intended to limit the scope of the invention.

Figure 4:
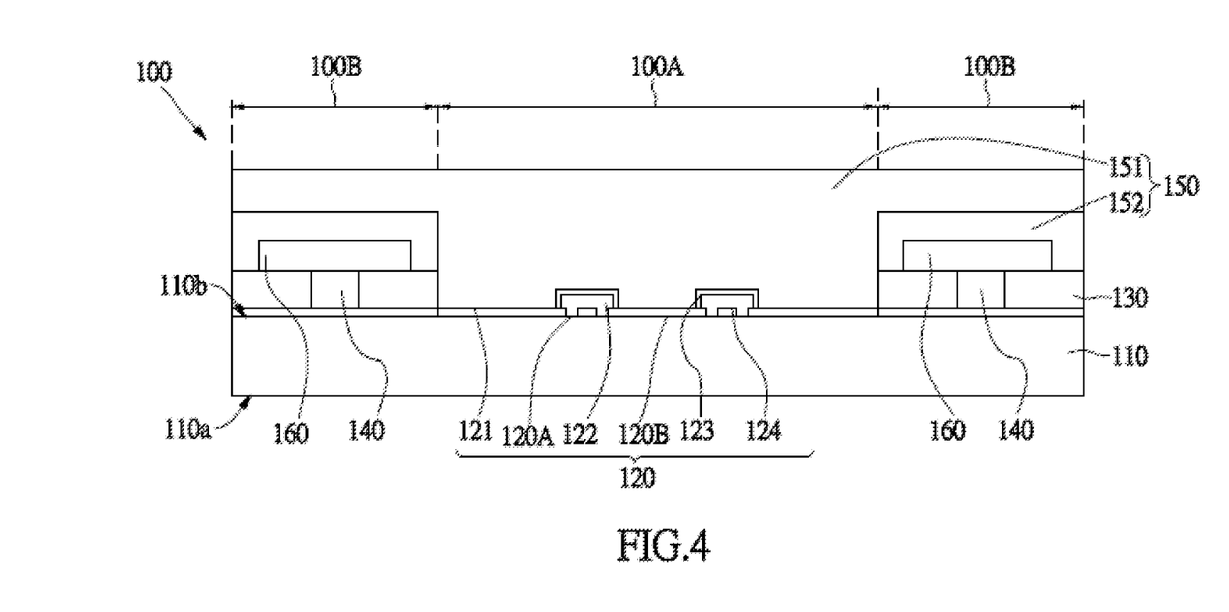
FIG. 4 shows a cross-sectional view of a touch panel according to a third embodiment of the instant disclosure.

Please refer to the FIG. 4. FIG. 4 shows a cross-sectional view of a touch panel according to a third embodiment of the instant disclosure. As illustrated in FIG. 4, the structure of the touch panel of the instant embodiment is substantially similar to the first embodiment as shown in FIG. 1. In the instant embodiment, the difference is the stacking sequence of the sensing electrode layer 120 and the shielding layer 130 of the touch panel 100. In the instant embodiment, the sequence of the processes is designed for disposing the sensing electrode layer 120 and then forming the shielding layer 130. That is to say, the sensing electrode layer 120 in the non-display area 100B is formed on a lower surface of the shielding layer 130. However, based on the design of the structure of the instant embodiment, an opening is formed on the shielding layer 130 to allow electrical communication between the already formed sensing electrode layer 120 and the signal transmitting layer 160. Furthermore, the electrical connecting layer 140 is formed by filling the conductive material into the opening portion. As a result, the sensing electrode layer 120 is electrically connected to the signal transmitting layer 160 by the electrical connecting layer 140 extending through the opening.

Figure 5:
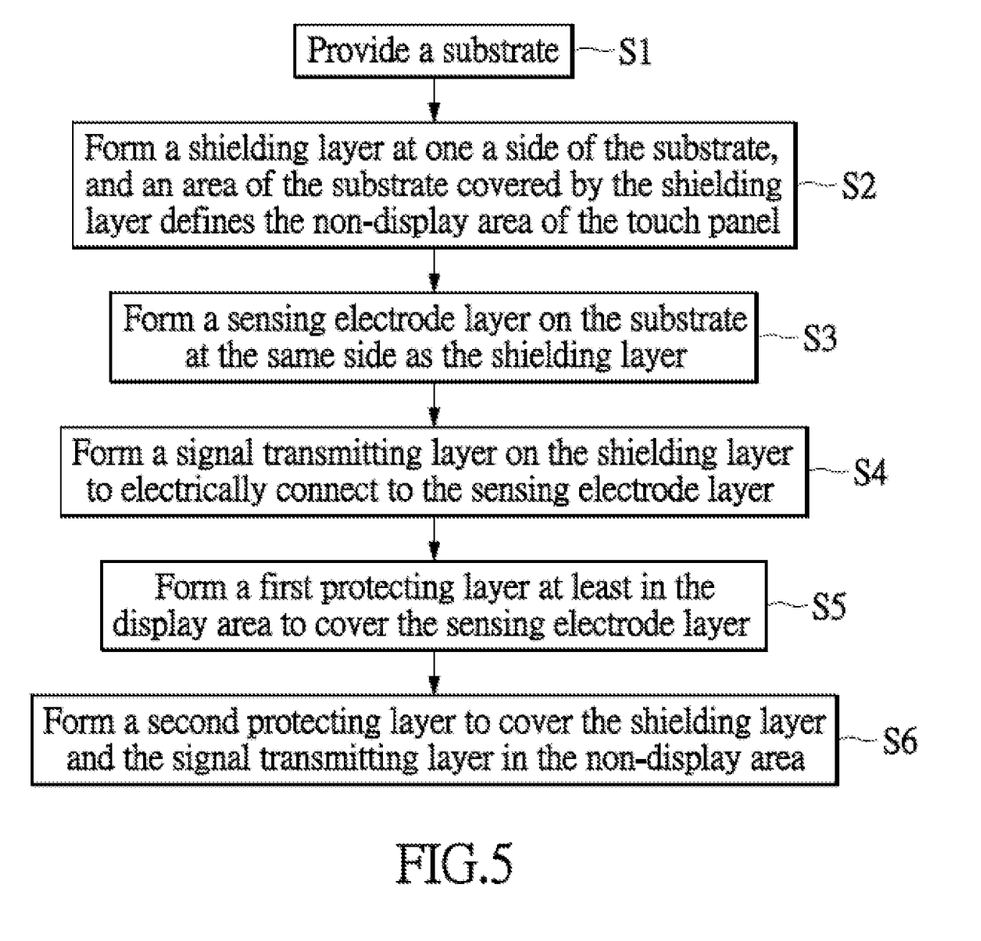
FIG. 5 is flow chart of the fabrication method for touch panel according to an embodiment of the instant disclosure.

Please refer to the FIG. 5. FIG. 5 is flow chart of the fabrication method for touch panel according to an embodiment of the instant disclosure. Firstly, in step S1, a substrate is provided. In step S2, a shielding layer is formed at a side of the substrate, and an area of the substrate covered by the shielding layer 130 defines the non-display area 100B of the touch panel.

In step S3, a sensing electrode layer is formed on the substrate at the same side as the shielding layer. In the instant embodiment, there is at least one portion of the sensing electrode layer formed on the surface of the substrate and in the display area of the touch panel, besides, the sensing electrode layer further extends to the non-display area and is arranged on the upper surface of the shielding layer in the non-display area formed in step S2.

Of course, in another embodiment, the order of the above step S2 and the above step S3 can also be exchanged. That is to say, the sensing electrode is formed, and the shielding layer is subsequently formed. It is thus the sensing electrode layer extending to the non-display area is arranged on the lower surface of the shielding layer.

In step S4, a signal transmitting layer is formed on the shielding layer to electrically connect to the sensing electrode layer.

In step S5, a first protecting layer is at least formed in the display area to cover the sensing electrode layer.

In step S6, a second protecting layer is formed to cover the shielding layer and the signal transmitting layer in the non-display area. The touch panel of the instant embodiment could be fabricated by performing the aforementioned steps.

In another embodiment, the order of the abovementioned step S5 and step S6 can also be exchanged. That is to say, the second protecting layer can be formed, and thereafter the first protecting layer is formed. As a result, the first protecting layer can be designed to be not merely formed in the display area, but extend to the surface of the second protecting layer in the non-display area so as to prevent the second protecting layer from peeling off.

At last, additional explanations may be provided. In each of the abovementioned embodiments, the insulating portion can be made by coating, lithography and etching processes, which are performed in sequence. Besides, the insulating portion is made of for example epoxy layer, polyimide layer or methyl methacrylate layer and so on. Additionally, the first electrode, the second electrode or the signal transmitting layer also may be manufactured by the deposition, the lithography, the etching processes and so on.

The aforementioned deposition process for example physical vapor deposition (PVD) or chemical vapor deposition (CVD). The physical vapor deposition (PVD) is such as evaporation or sputtering deposition, and the chemical vapor deposition is such as low pressure chemical vapor deposition (LPCVD), metal-organic chemical vapor deposition (MOCVD), plasma-enhanced chemical vapor deposition (PECVD) or photo chemical vapor deposition (PHOTO CVD). The aforementioned etching process may be chemical etching or laser etching process.

Furthermore, the first electrode and the second electrode of the aforementioned embodiments may be made of the transparent conductive material. The transparent conductive material such as indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO) and the like. Besides, the signal transmitting layer 160 may be made of Au, Ag, Cu, Ni, Al, Cr or the combination thereof, for example, the structure of the signal transmitting layer 160 is a Mo/Al/Mo stack, wherein the Al layer is sandwiched between the two Mo layers.

In summary, the color difference may be avoided, and the factors reducing the transparency of the touch panel may be weakened. In addition, the protecting layer has two different portions which may be made of different materials. In addition to protection, the first protecting layer covers the sensing electrode layer and has a refractive index larger than or equal to that of the sensing electrode, and therefore the difference of the refractive indices is minimized. In addition to protection, the second protecting layer, which correspondingly covers the shielding layer, provides a reliable adhesion to the shielding layer. Taken as a whole, the display quality of the touch panel can be improved.

The descriptions illustrated supra set forth simplify the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A fabricating method of a touch panel, wherein the touch panel defines a display area and a non-display area, the method comprising:
   forming a shielding layer on a side of a substrate, wherein an area of the substrate covered by the shielding layer defines the non-display area;
   forming a sensing electrode layer on the side of the substrate, wherein at least a portion of the sensing electrode layer superimposes the display area;
   forming a first protecting layer at least on the display area to cover the sensing electrode layer; and
   forming a second protecting layer merely on non-display area to cover the shielding layer.

2. The fabricating method of the touch panel according to claim 1, wherein:
   the first protecting layer is a refractive index compensating layer, and
   the second protecting layer is an attaching layer.

3. The fabricating method of the touch panel according to claim 1, wherein:
   the first protecting layer further extends to the non-display area, and
   the first protecting layer is formed on a surface of the second protecting layer.

4. The fabricating method of the touch panel according to claim 1, further comprising:
   forming a signal transmitting layer on a surface of the shielding layer to electrically connect to the sensing electrode layer before forming the second protecting layer.

5. The fabricating method of the touch panel according to claim 1, wherein:
   the sensing electrode layer further extends to the non-display area, and
   forming the sensing electrode layer comprises forming the sensing electrode layer-before forming the shielding layer so that the sensing electrode layer is formed between the substrate and the shielding layer.

6. The fabricating method of the touch panel according to claim 1, wherein:
the sensing electrode layer further extends to the non-display area, and
forming the sensing electrode layer comprises forming the sensing electrode layer-after forming the shielding layer so that the sensing electrode layer is formed between the shielding layer and the second protecting layer.

7. The fabricating method of the touch panel according to claim 1, wherein:
the first protecting layer contacts the second protecting layer, and
a physical interface is defined where the first protecting layer contacts the second protecting layer.

8. The fabricating method of the touch panel according to claim 1, wherein the first protecting layer and the second protecting layer are made of different materials.

9. The fabricating method of the touch panel according to claim 1, wherein a refractive index of the first protecting layer is greater than or equal to a refractive index of the sensing electrode layer.

10. The fabricating method of the touch panel according to claim 1, wherein forming the first protecting layer comprises:
forming the first protecting layer after forming the second protecting layer.

11. The fabricating method of the touch panel according to claim 10, wherein forming the first protecting layer comprises:
forming the first protecting layer to cover the second protecting layer in the non-display area.

12. The fabricating method of the touch panel according to claim 11, wherein forming the first protecting layer comprises:
forming the first protecting layer to contact the sensing electrode layer in the display area.

13. The fabricating method of the touch panel according to claim 1, wherein forming the first protecting layer comprises:
forming a first refractive index layer to cover the sensing electrode layer; and
forming a second refractive index layer to cover the first refractive index layer, wherein:
the first refractive index layer has a first refractive index, and
the second refractive index layer has a second refractive index different than the first refractive index.

14. The fabricating method of the touch panel according to claim 13, wherein:
the sensing electrode layer has a third refractive index greater than the first refractive index, and
the second refractive index is greater than the third refractive index.

15. The fabricating method of the touch panel according to claim 1, wherein:
the first protecting layer comprises at least one of silicon dioxide ($SiO_2$) or niobium pentoxide ($Nb_2O_5$), and
the second protecting layer comprises an organic material.

16. The fabricating method of the touch panel according to claim 1, wherein:
the first protecting layer contacts the sensing electrode layer, and
the second protecting layer contacts the shielding layer.

17. A fabricating method of a touch panel, wherein the touch panel defines a display area and a non-display area, the method comprising:
forming a shielding layer on a side of a substrate, wherein an area of the substrate covered by the shielding layer defines the non-display area;
forming a sensing electrode layer on the side of the substrate, wherein at least a portion of the sensing electrode layer superimposes the display area;
forming a first protecting layer at least on the display area to cover the sensing electrode layer; and
forming a second protecting layer on non-display area to cover the shielding layer, wherein:
the second protecting layer contacts the first protecting layer, and
a physical interface is defined where the second protecting layer contacts the first protecting layer.

18. The fabricating method of the touch panel according to claim 17, wherein:
a sidewall and an upper surface of the second protecting layer contact the first protecting layer.

19. The fabricating method of the touch panel according to claim 17, wherein:
a sidewall of the second protecting layer contacts a sidewall of the first protecting layer, and
the physical interface overlies the shielding layer.

20. A fabricating method of a touch panel, wherein the touch panel defines a display area and a non-display area, the method comprising:
forming a shielding layer on a side of a substrate, wherein an area of the substrate covered by the shielding layer defines the non-display area;
forming a sensing electrode layer on the side of the substrate, wherein at least a portion of the sensing electrode layer superimposes the display area;
forming a first protecting layer at least on the display area to cover the sensing electrode layer; and
forming a second protecting layer on non-display area to cover the shielding layer, wherein the first protecting layer and the second protecting layer are made of different materials.

* * * * *